(12) United States Patent
Ding et al.

(10) Patent No.: US 10,649,586 B2
(45) Date of Patent: May 12, 2020

(54) SYSTEM AND METHOD FOR TOUCH AND INTERACTION IN A THREE-DIMENSION DISPLAY

(71) Applicant: BOE TECHNOLOGY GROUP CO., LTD., Beijing (CN)

(72) Inventors: Xiaoliang Ding, Beijing (CN); Haisheng Wang, Beijing (CN); Yingming Liu, Beijing (CN); Yanling Han, Beijing (CN); Chih-Jen Cheng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 126 days.

(21) Appl. No.: 15/769,409

(22) PCT Filed: Sep. 29, 2017

(86) PCT No.: PCT/CN2017/104510
§ 371 (c)(1),
(2) Date: Apr. 19, 2018

(87) PCT Pub. No.: WO2018/161551
PCT Pub. Date: Sep. 13, 2018

(65) Prior Publication Data
US 2019/0073088 A1 Mar. 7, 2019

(30) Foreign Application Priority Data

Mar. 10, 2017 (CN) .......................... 2017 1 0142881

(51) Int. Cl.
*G06F 3/01* (2006.01)
*G06F 3/043* (2006.01)
(Continued)

(52) U.S. Cl.
CPC ............ *G06F 3/0436* (2013.01); *G06F 3/011* (2013.01); *G06F 3/016* (2013.01); *G06F 3/043* (2013.01);
(Continued)

(58) Field of Classification Search
None
See application file for complete search history.

(56) References Cited

U.S. PATENT DOCUMENTS

| 5,031,154 A | 7/1991 | Watanabe |
| 2012/0243374 A1* | 9/2012 | Dahl ....................... G06F 3/043 367/93 |

(Continued)

FOREIGN PATENT DOCUMENTS

| CN | 103455171 | 12/2013 |
| CN | 104035561 | 9/2014 |

(Continued)

OTHER PUBLICATIONS

International Searching Authority; "International Search Report and Written Opinion," issued in connection with International Patent Application No. PCT/CN2017/104510, dated Dec. 29, 2017, 12 pages.

(Continued)

*Primary Examiner* — Carl Adams
(74) *Attorney, Agent, or Firm* — Arent Fox LLP; Michael Fainberg

(57) ABSTRACT

There are disclosed a system and method for touch and interaction in a three-dimension display, and after a three-dimension touch and interaction mode is enabled, a relative location relationship between a touch position of an operator and a display panel is determined according to transmitting time of ultrasonic signals transmitted by at least two ultrasonic transmitters and receiving time when ultrasonic sig- (Continued)

---

Determine a relative location relationship between a touch position of an operator and a display panel according to transmitting time of ultrasonic signals transmitted by at least two ultrasonic transmitters and receiving time of ultrasonic signals received by at least two ultrasonic sensors, after a three-dimension touch and interaction mode is enabled, where the ultrasonic signals received by the ultrasonic sensors are ultrasonic signals reflected at the touch position of the operator — S101

Control the ultrasonic transmitters to transmit ultrasonic signals at preset power to the touch position of the operator according to a three-dimension object currently displayed on the display panel and the relative location relationship between the touch position of the operator and the display panel to make feedback for a touch operation at the touch position of the operator, where the preset power matches a material of the three-dimension object and a touch relationship between the three-dimension object and the touch position of the operator — S102 nals reflected at the touch position of the operator are received by at least two ultrasonic sensors; and then the ultrasonic transmitters are controlled to transmit ultrasonic signals at preset power to the touch position of the operator according to a three-dimension object currently displayed on the display panel and the relative location relationship between the touch position of the operator and the display panel to make feedback for a touch operation at the touch position of the operator.

7 Claims, 5 Drawing Sheets

(51) Int. Cl.
*G06F 3/0481* (2013.01)
*G06F 3/041* (2006.01)

(52) U.S. Cl.
CPC ........ *G06F 3/0416* (2013.01); *G06F 3/04815* (2013.01); *G06F 2203/04101* (2013.01)

(56) References Cited

U.S. PATENT DOCUMENTS

2015/0072738 A1* 3/2015 Mankowski ............ G08B 6/00
455/566
2015/0091818 A1* 4/2015 Kim ........................ G06F 3/016
345/173
2016/0147305 A1* 5/2016 Hong ...................... G06F 3/016
345/175

FOREIGN PATENT DOCUMENTS

| | | |
|---|---|---|
| CN | 104331152 | 2/2015 |
| CN | 104407692 | 3/2015 |
| CN | 104679238 | 6/2015 |
| CN | 104699235 | 6/2015 |
| CN | 104991686 | 10/2015 |
| CN | 105426024 | 3/2016 |
| CN | 105872214 | 8/2016 |
| CN | 106843502 | 6/2017 |

OTHER PUBLICATIONS

The State Intellectual Property Office of People's Republic of China, "First Office Action," issued in connection with Chinese Patent Application No. 201710142881.4, dated Mar. 8, 2019, 34 pages.

* cited by examiner

SYSTEM AND METHOD FOR TOUCH AND INTERACTION IN A THREE-DIMENSION DISPLAY

This application is a US National Stage of International Application No. PCT/CN2017/104510, filed on Sep. 29, 2017, designating the United States and claiming priority to Chinese Patent Application No. 201710142881.4, filed with the Chinese Patent Office on Mar. 10, 2017, and entitled "A system and method for touch and interaction in a three-dimension display", the content of which is hereby incorporated by reference in its entirety.

FIELD

The present disclosure relates to the field of display technologies, and particularly to a system and method for touch and interaction in a three-dimension display.

BACKGROUND

At present, the virtual reality (AV/VR) technologies have been widely discussed. A naked-eye three-dimension (3D) display has been achieved on a display device, e.g., a TV set, etc., to simulate visual perception. However as for tactile perception, only a three-dimension position of a touch can be determined using the existing technologies, but tactile perception cannot be achieved in reality.

SUMMARY

Embodiments of the present disclosure provide a system and method for touch and interaction in a three-dimension display.

An embodiment of the present disclosure provides a system for touch and interaction in a three-dimension display, including: a display panel, at least two ultrasonic transmitters and at least two ultrasonic sensors arranged on sides of the display panel, a location detecting device, and a master control device, wherein the location detecting device is coupled respectively to the ultrasonic transmitters and the ultrasonic sensors, and is configured to determine a relative location relationship between a touch position of an operator and the display panel, according to transmitting time of ultrasonic signals transmitted by the at least two ultrasonic transmitters and receiving time of ultrasonic signals received by the at least two ultrasonic sensors, after a three-dimension touch and interaction mode is enabled, wherein the ultrasonic signals received by the ultrasonic sensors are ultrasonic signals reflected at the touch position of the operator; and the master control device is coupled respectively to the display panel, the ultrasonic transmitters and the location detecting device, and is configured to control the ultrasonic transmitters to transmit ultrasonic signals at preset power to the touch position of the operator according to a three-dimension object currently displayed on the display panel and the relative location relationship between the touch position of the operator and the display panel to make feedback for a touch operation at the touch position of the operator, wherein the preset power matches a material of the three-dimension object and a touch relationship between the three-dimension object and the touch position of the operator.

In a possible implementation, in the system above for touch and interaction according to the embodiment of the present disclosure, the system further includes: a depth-of-focus correcting device coupled respectively to the location detecting device and the master control device, wherein the master control device is further configured to control the display panel to display at least two depth-of-focus test images before the three-dimension touch and interaction mode is enabled; the location detecting device is configured to determine the relative location relationship between the touch position of the operator and the display panel according to the transmitting time of the ultrasonic signals transmitted by the at least two ultrasonic transmitters and the receiving time of the ultrasonic signals received by the at least two ultrasonic sensors, wherein the ultrasonic signals received by the ultrasonic sensors are the ultrasonic signals reflected at the touch position of the operator; and the depth-of-focus correcting device is configured to correct errors between depths of focus perceived by the operator and preset depths of focus of the depth-of-focus test images according to the depth-of-focus test images and the relative location relationship between the touch position of the operator and the display panel.

In a possible implementation, in the system above for touch and interaction according to the embodiment of the present disclosure, the system includes four ultrasonic sensors; the master control device is configured to control the at least two ultrasonic transmitter to transmit first ultrasonic signals scanning touch and interaction areas corresponding to areas where the ultrasonic sensors are located; and to control the ultrasonic transmitters to transmit second ultrasonic signals towards azimuths, of the touch position of the operator relative to the ultrasonic sensors, determined by the location detecting device, according to the azimuths; and the location detecting device is configured to determine the azimuths of the touch position of the operator relative to the ultrasonic sensors according to the differences between receiving time when the first ultrasonic signals reflected at the touch position of the operator are received by the respective ultrasonic sensors; to determine absolute distances between the touch position of the operator and the respective ultrasonic sensors according to the differences between receiving time when the second ultrasonic signals reflected at the touch position of the operator are received by the respective ultrasonic sensors and transmitting time when the second ultrasonic signals are transmitted by the respective ultrasonic transmitters; and to determine the relative location relationship between the touch position of the operator and the display panel according to the average of the absolute distances between the touch position of the operator, and the respective ultrasonic sensors.

In a possible implementation, in the system above for touch and interaction according to the embodiment of the present disclosure, the master control device is configured to control phases of first ultrasonic signals transmitted by two sets of ultrasonic transmitters located respectively on two sides of the display panel, wherein directions with the largest transmit energy produced as a result of wave interference between two first ultrasonic signals transmitted by each set of ultrasonic transmitters are scan directions, and to control the scan directions of the two sets of ultrasonic transmitters to rotate in opposite directions to scan the touch and interaction areas corresponding to the areas where the ultrasonic sensors are located, wherein scanning areas of the two sets of ultrasonic transmitters do not overlap with each other.

In a possible implementation, in the system above for touch and interaction according to the embodiment of the present disclosure, the ultrasonic transmitters are loudspeakers.

In another aspect, an embodiment of the present disclosure further provides a method for touch and interaction in a three-dimension display, including: after a three-dimension touch and interaction mode is enabled, determining a relative location relationship between a touch position of an operator and a display panel, according to transmitting time of ultrasonic signals transmitted by at least two ultrasonic transmitters and receiving time of ultrasonic signals received by at least two ultrasonic sensors, wherein the ultrasonic signals received by the ultrasonic sensors are ultrasonic signals reflected at the touch position of the operator; and controlling the ultrasonic transmitters to transmit ultrasonic signals at preset power to the touch position of the operator according to a three-dimension object currently displayed on the display panel and the relative location relationship between the touch position of the operator and the display panel to make feedback for a touch operation at the touch position of the operator, wherein the preset power matches a material of the three-dimension object and a touch relationship between the three-dimension object and the touch position of the operator.

In a possible implementation, in the method above for touch and interaction according to the embodiment of the present disclosure, before the three-dimension touch and interaction mode is enabled, the method further includes: controlling the display panel to display at least two depth-of-focus test images; determining the relative location relationship between the touch position of the operator and the display panel according to the transmitting time of the ultrasonic signals transmitted by the at least two ultrasonic transmitters and the receiving time of the ultrasonic signals received by the at least two ultrasonic sensors, wherein the ultrasonic signals received by the ultrasonic sensors are the ultrasonic signals reflected at the touch position of the operator; and correcting errors between depths of focus perceived by the operator and preset depths of focus of the depth-of-focus test images according to the depth-of-focus test images and the relative location relationship between the touch position of the operator and the display panel.

In a possible implementation, in the method above for touch and interaction according to the embodiment of the present disclosure, determining the relative location relationship between the touch position of the operator and the display panel according to the transmitting time of the ultrasonic signals transmitted by the at least two ultrasonic transmitters and the receiving time of the ultrasonic signals received by the at least two ultrasonic sensors includes: there are four ultrasonic sensors; controlling the at least two ultrasonic transmitter to transmit first ultrasonic signals scanning touch and interaction areas corresponding to areas where the ultrasonic sensors are located; determining azimuths of the touch position of the operator relative to the ultrasonic sensors according to the differences between receiving time when the first ultrasonic signals reflected at the touch position of the operator are received by the respective ultrasonic sensors; controlling the ultrasonic transmitters to transmit second ultrasonic signals towards the azimuths; determining absolute distances between the touch position of the operator and the respective ultrasonic sensors according to the differences between receiving time when the second ultrasonic signals reflected at the touch position of the operator are received by the respective ultrasonic sensors and transmitting time when the second ultrasonic signals are transmitted by the respective ultrasonic transmitters; and determining the relative location relationship between the touch position of the operator and the display panel according to the average of the absolute distances between the touch position of the operator and the respective ultrasonic sensors.

In a possible implementation, in the method above for touch and interaction according to the embodiment of the present disclosure, controlling the at least two ultrasonic transmitters to transmit the first ultrasonic signals scanning the touch and interaction areas corresponding to the areas where the ultrasonic sensors are located includes: controlling phases of first ultrasonic signals transmitted by two sets of ultrasonic transmitters located respectively on two sides of the display panel, wherein directions with the largest transmit energy produced as a result of wave interference between two first ultrasonic signals transmitted by each set of ultrasonic transmitters are scan directions, and controlling the scan directions of the two sets of ultrasonic transmitters to rotate in opposite directions to scan the touch and interaction areas corresponding to the areas where the ultrasonic sensors are located, wherein scanning areas of the two sets of ultrasonic transmitters do not overlap with each other.

In a possible implementation, in the method above for touch and interaction according to the embodiment of the present disclosure, the display panel is a TV set, and the ultrasonic transmitters are loudspeakers of the TV set.

DETAILED DESCRIPTION OF THE EMBODIMENTS

Particular implementations of the system and method for touch and interaction in a three-dimension display according to the embodiments of the disclosure will be described below in details with reference to the drawings.

Figure 1:
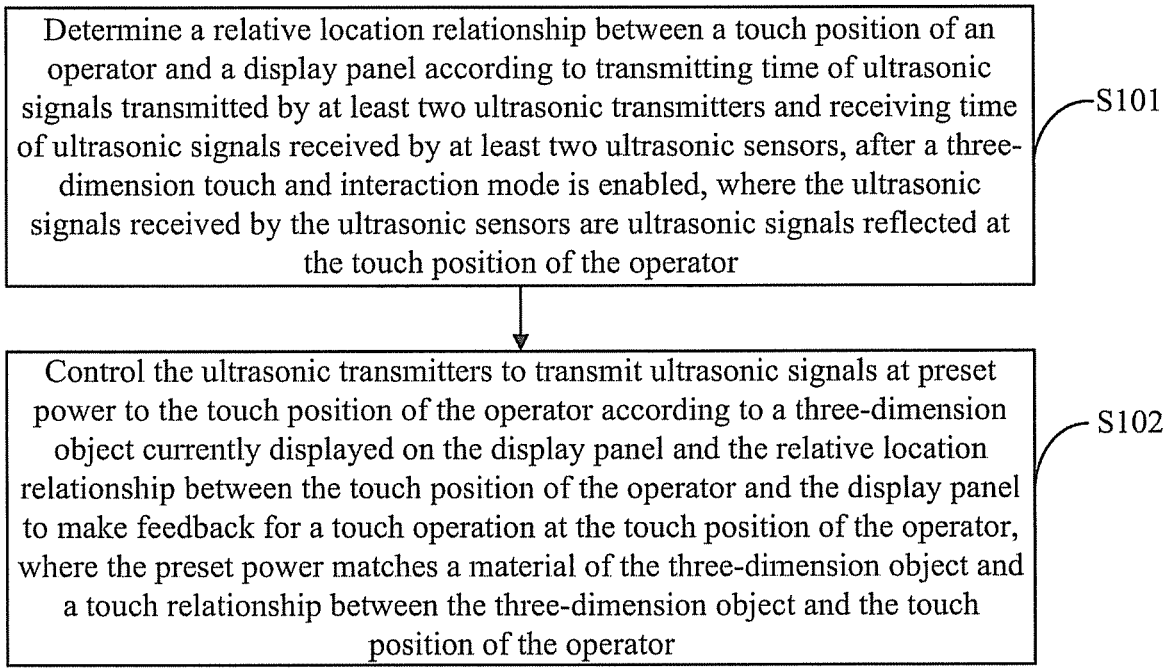
FIG. 1 is a first flow chart of a method for touch and interaction in a three-dimension display according to an embodiment of the present disclosure.

As illustrated in FIG. 1, a method for touch and interaction in a three-dimension display according to an embodiment of the present disclosure particularly includes the following steps.

The step S101 is to detet mine a relative location relationship between a touch position of an operator and a display panel according to transmitting time of ultrasonic signals transmitted by at least two ultrasonic transmitters and receiving time of ultrasonic signals received by at least two ultrasonic sensors, after a three-dimension touch and interaction mode is enabled, where the ultrasonic signals received by the ultrasonic sensors are ultrasonic signals reflected at the touch position of the operator.

The step S102 is to control the ultrasonic transmitters to transmit ultrasonic signals at preset power to the touch position of the operator according to a three-dimension object currently displayed on the display panel and the relative location relationship between the touch position of the operator and the display panel to make feedback for a touch operation at the touch position of the operator, where the preset power matches a material of the three-dimension object and a touch relationship between the three-dimension object and the touch position of the operator.

Particularly feedback is made for the touch operation through controlling the ultrasonic signals in the method above for touch and interaction in a three-dimension display according to the embodiment of the present disclosure, so that tactile perception can be obtained at the touch position of the operator; and the material of the currently displayed three-dimension object can be simulated through controlling the transmit power of the ultrasonic signals, so that a resisting force matching the material of the currently displayed three-dimension object can be perceived at the touch position of the operator, to thereby achieve satisfactory touch and interaction and tactile perception so as to improve a user experience of the operator.

Furthermore in three-dimension touch and interaction in the method above for touch and interaction in a three-dimension display according to the embodiment of the present disclosure, each human operator may have different perception, so such a situation may occur that a preset depth of focus of the currently displayed three-dimension object is different from a depth of focus really perceived by the operator, so that after the touch position of the operator is determined according to the ultrasonic signals, there may be an error when feedback is made for the touch operation at the touch position. In view of this, optionally the depth of focus of the three-dimension display is preferably corrected according to the perception by the operator before three-dimension touch and interaction.

Figure 2:
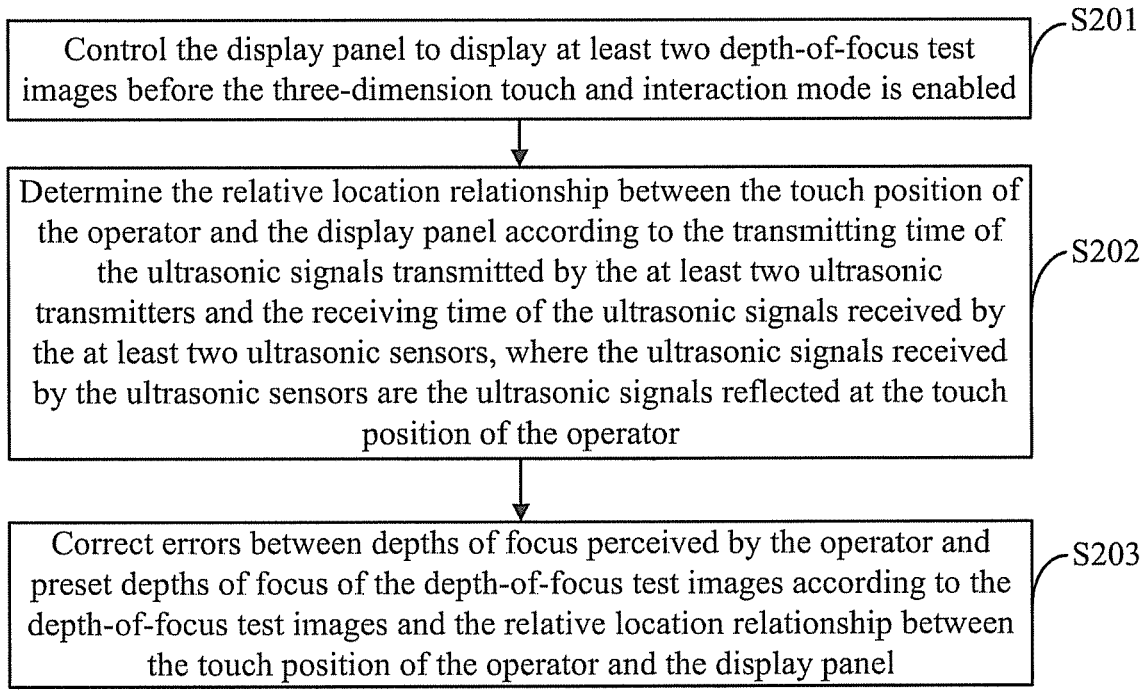
FIG. 2 is a second flow chart of the method for touch and interaction in a three-dimension display according to the embodiment of the present disclosure.

Hereupon optionally in the method above for touch and interaction in a three-dimension display according to the embodiment of the present disclosure, in order to improve the precision of touch so as to improve an interaction experience in touch and interaction, as illustrated in FIG. 2, the method can further include the following steps.

The step S201 is to control the display panel to display at least two depth-of-focus test images before the three-dimension touch and interaction mode is enabled, where optionally three depth-of-focus test images are displayed.

The step S202 is to determine the relative location relationship between the touch position of the operator and the display panel according to the transmitting time of the ultrasonic signals transmitted by the at least two ultrasonic transmitters and the receiving time of the ultrasonic signals received by the at least two ultrasonic sensors, where the ultrasonic signals received by the ultrasonic sensors are the ultrasonic signals reflected at the touch position of the operator.

The step S203 is to correct errors between depths of focus perceived by the operator and preset depths of focus of the depth-of-focus test images according to the depth-of-focus test images and the relative location relationship between the touch position of the operator and the display panel.

Optionally the errors of depths of focus perceived by the operator and preset depths of focus of the depth-of-focus test images can be corrected according to the depth-of-focus test images and the relative location relationship between the touch position of the operator and the display panel in the step S203 above particularly in a number of implementations, and for example, the difference between the preset depths of focus of every two displayed depth-of-focus test images can be compared with the difference between the depths of focus of the respective depth-of-focus test images really perceived by the operator represented by the location of the touch position detected from the ultrasonic signals, and they can be normalized and corrected so that they match each other.

Optionally in the process of correcting the depth of focus in the method above for touch and interaction in a three-dimension display according to the embodiment of the present disclosure, a plurality of depth-of-focus test images can be displayed in sequence, and after each depth-of-focus test image is displayed, the location of the touch position of the operator relative to the display panel can be detected using the ultrasonic signals; or a plurality of depth-of-focus test images can be displayed concurrently, and thereafter the location of the touch position of the operator relative to the display panel can be detected in sequence using the ultrasonic signals, although the embodiment of the present disclosure will not be limited thereto.

Optionally in the method above for touch and interaction in a three-dimension display according to the embodiment of the present disclosure, in either the step S101 of determining a relative location relationship between the touch position of the operator and the display panel according to the transmitting time of the ultrasonic signals transmitted by the at least two ultrasonic transmitters and the receiving time of the ultrasonic signals received by the at least two ultrasonic sensors, after the three-dimension touch and interaction mode is enabled, or the step S202 of determining a relative location relationship between the touch position of the operator and the display panel according to the transmitting time of the ultrasonic signals transmitted by the at least two ultrasonic transmitters and the receiving time of the ultrasonic signals received by the at least two ultrasonic sensors, before the three-dimension touch and interaction mode is enabled, the location shall be determined using at least the two ultrasonic receivers because that each ultrasonic receiver can determine the distance of an object from a sphere where the ultrasonic receiver is located, and the two spheres of the two ultrasonic receivers are sure to intersect with each other, thus resulting in an arc plane; and there are known directions and frequencies of the ultrasonic signals transmitted by the ultrasonic transmitters, and there is a fixed relative location relationship between the ultrasonic transmitters and the ultrasonic receivers, so the location of the object can be determined.

Figure 3:
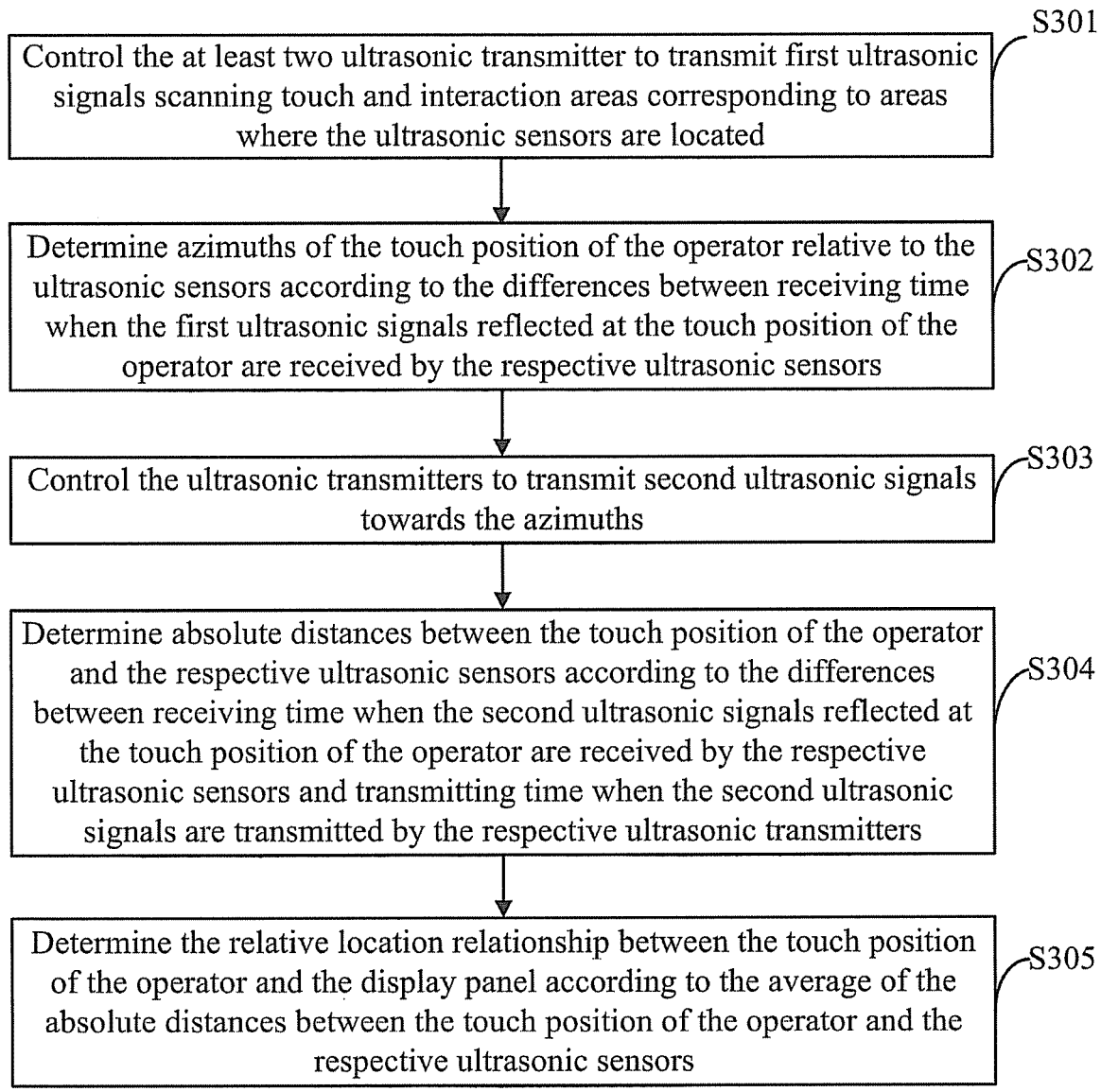
FIG. 3 is a particular flow chart of the method for touch and interaction in a three-dimension display according to the embodiment of the present disclosure.

Particularly as illustrated in FIG. 3, both the step S101 and the step S102 can be performed in the following particular steps.

There are four ultrasonic sensors.

The step S301 is to control the at least two ultrasonic transmitter to transmit first ultrasonic signals scanning touch and interaction areas corresponding to areas where the ultrasonic sensors are located, so that the first ultrasonic signals are received by the respective ultrasonic sensors after being reflected at the touch position of the operator in the touch and interaction areas.

The step S302 is to determine azimuths of the touch position of the operator relative to the ultrasonic sensors according to the differences between receiving time when the first ultrasonic signals reflected at the touch position of the operator are received by the respective ultrasonic sensors, that is, to determine the azimuths of the touch position of the operator relative to the respective ultrasonic sensors according to the differences between receiving time when the first ultrasonic signals reflected at the touch position of the operator are received by the respective ultrasonic sensors. Only relative locations of the touch position of the operator can be determined in this step, and absolute locations of the touch position of the operator may be further determined in the following steps.

The step S303 is to control the ultrasonic transmitters to transmit second ultrasonic signals towards the azimuths, where optionally all the ultrasonic transmitters may be controlled to transmit the second ultrasonic signals towards the corresponding azimuths, or only a part of the ultrasonic transmitters may be controlled to transmit the second ultrasonic signals towards the corresponding azimuths, although the embodiment of the present disclosure will not be limited thereto.

The step S304 is to determine absolute distances between the touch position of the operator and the respective ultrasonic sensors according to the differences between receiving time when the second ultrasonic signals reflected at the touch position of the operator are received by the respective ultrasonic sensors and transmitting time when the second ultrasonic signals are transmitted by the respective ultrasonic transmitters. Optionally the absolute distances between the touch position of the operator and the respective ultrasonic sensors can be determined according to the time when the second ultrasonic signals reflected at the touch position of the operator are received by the respective ultrasonic sensors.

The step S305 is to determine the relative location relationship between the touch position of the operator and the display panel according to the average of the absolute distances between the touch position of the operator and the respective ultrasonic sensors.

Optionally in the method above for touch and interaction in a three-dimension display according to the embodiment of the present disclosure, the at least two ultrasonic transmitters can be controlled in the step S301 to transmit the first ultrasonic signals scanning the touch and interaction areas corresponding to the areas where the ultrasonic sensors are located, particularly in the following implementation.

Figure 4:
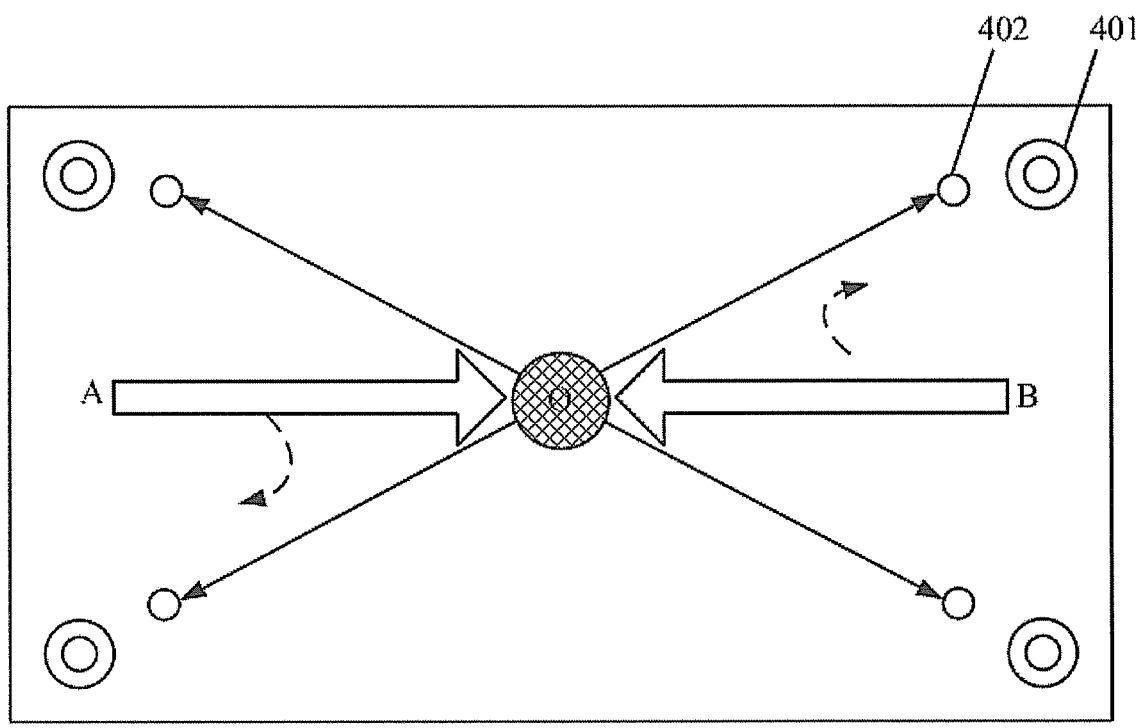
FIG. 4 is a schematic principle diagram of the method for touch and interaction in a three-dimension display according to the embodiment of the present disclosure.

As illustrated in FIG. 4, phases of first ultrasonic signals transmitted by two sets of ultrasonic transmitters 401 located respectively on two sides of the display panel are controlled, where directions with the largest transmit energy produced as a result of wave interference between two first ultrasonic signals transmitted by each set of ultrasonic transmitters 401 are scan directions A and B, and the scan directions A and B of the two sets of ultrasonic transmitters 401 are controlled to rotate in opposite directions (denoted by dotted arrows in FIG. 4) to scan the touch and interaction areas corresponding to the areas where the ultrasonic sensors 402 are located, where the scanning areas of the two sets of ultrasonic transmitters 401 do not overlap with each other. In this way, a scanning period of time can be shortened. In FIG. 4, O represents the touch position of the operator.

The particular implementation of the step S301, in which the at least two ultrasonic transmitters are controlled to transmit the first ultrasonic signals scanning the touch and interaction areas corresponding to the areas where the ultrasonic sensors are located, has only been described by way of an example, but those skilled in the art shall appreciate that the step S301 in the embodiment of the present disclosure can alternatively be performed in other implementations, and will not be limited thereto.

Figure 5:
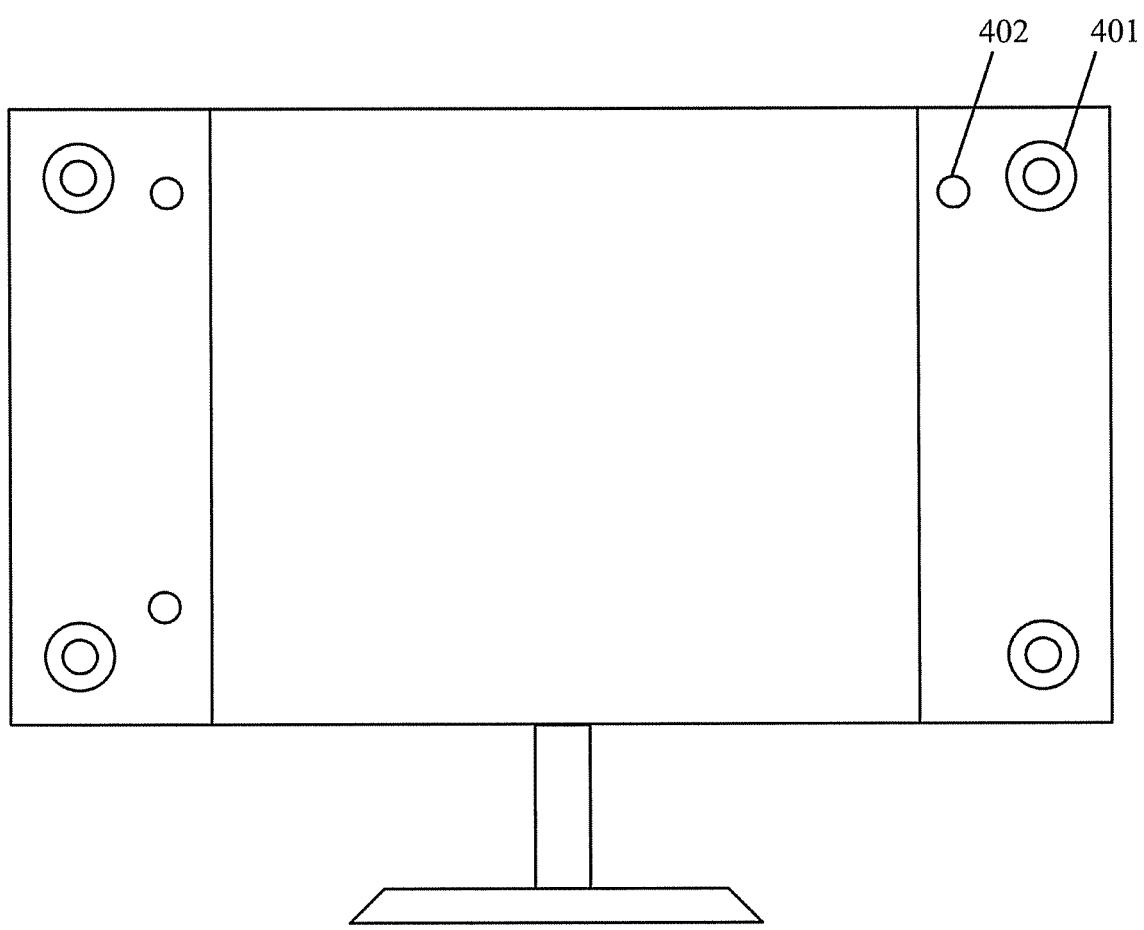
FIG. 5 is a schematic structural diagram of a display panel to which the method for touch and interaction in a three-dimension display according to the embodiment of the present disclosure is applied.

At present, as there are a gradually improving audio effect and also an increasing number of channels, of a TV set product, when the method above for touch and interaction in a three-dimension display according to the embodiment of the present disclosure is applied to three-dimension touch and interaction on the TV set, the TV set can be structured with four channels, where an ultrasonic signal is transmitted by a loudspeaker of each channel, and at least four ultrasonic sensors are placed at acoustic positions, thus achieving three-dimension touch and interaction. Stated otherwise, optionally as illustrated in FIG. 5, the ultrasonic transmitters can be loudspeakers, so high-power ultrasonic signals can be transmitted to the location of the touch position of the operator using the loudspeakers, so that there is tactile perception by the operator. If a touched three-dimension virtual object is made of a different material, then the acoustics may be further controlled to transmit ultrasonic signals at different power, so that the different material or a different resisting force is perceived by the operator.

Based upon the same inventive idea, an embodiment of the present disclosure further provides a system for touch and interaction in a three-dimension display, and since the system addresses the problem under a similar principle to the method above for touch and interaction in a three-dimension display, reference can be made to the implementation of the method for an implementation of the system, and a repeated description thereof will be omitted here.

Figure 6:
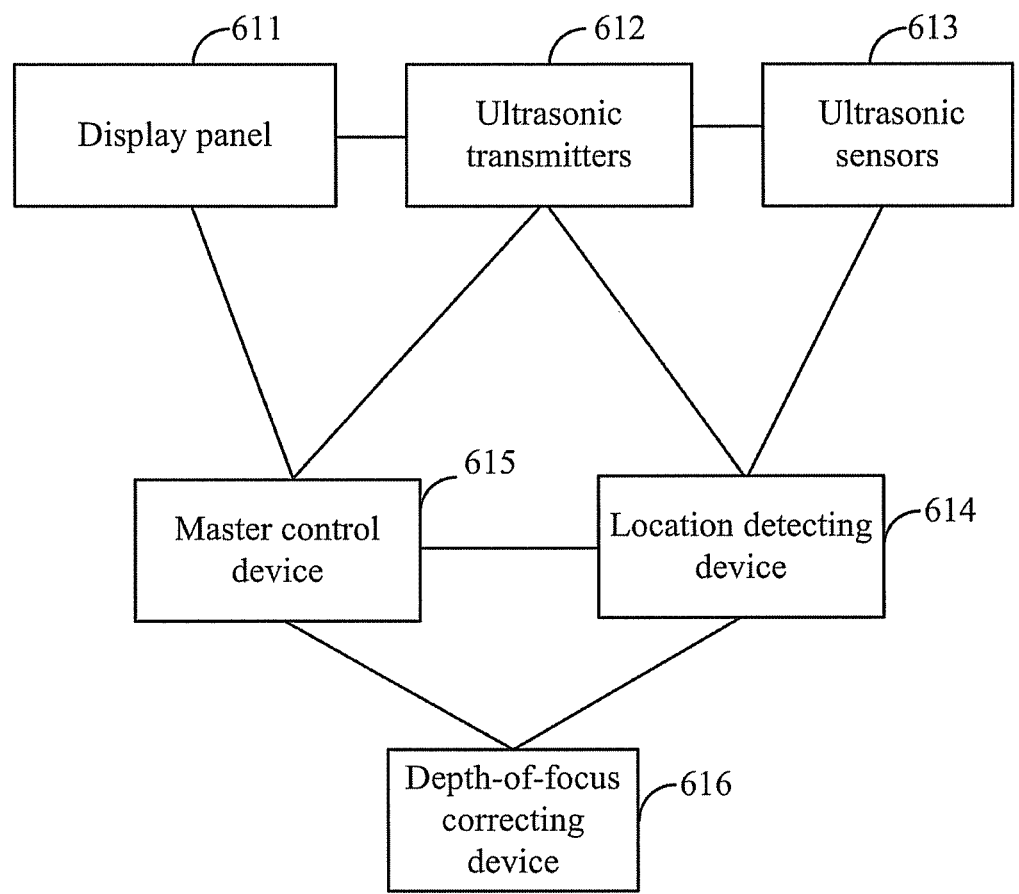
FIG. 6 is a schematic structural diagram of a system for touch and interaction in a three-dimension display according to an embodiment of the present disclosure.

Particularly as illustrated in FIG. 6, a system for touch and interaction in a three-dimension display according to an embodiment of this discourse includes: a display panel 611, at least two ultrasonic transmitters 612 and at least two ultrasonic sensors 613 arranged on sides of the display panel 611, a location detecting device 614, and a master control device 615.

The location detecting device 614 is coupled respectively to the ultrasonic transmitters 612 and the ultrasonic sensors 613, and is configured to determine a relative location relationship between a touch position of an operator and the display panel 611 according to transmitting time of ultrasonic signals transmitted by the at least two ultrasonic transmitters 612 and receiving time of ultrasonic signals received by the at least two ultrasonic sensors 613, after a three-dimension touch and interaction mode is enabled, where the ultrasonic signals received by the ultrasonic sensors 613 are ultrasonic signals reflected at the touch position of the operator.

The master control device 615 is coupled respectively to the display panel 611, the ultrasonic transmitters 612 and the location detecting device 614, and is configured to control the ultrasonic transmitters 612 to transmit ultrasonic signals at preset power to the touch position of the operator according to a three-dimension object currently displayed on the display panel 611 and the relative location relationship between the touch position of the operator and the display panel 611 to make feedback for a touch operation at the touch position of the operator, where the preset power matches a material of the three-dimension object and a touch relationship between the three-dimension object and the touch position of the operator.

Optionally in the system above for touch and interaction in a three-dimension display according to the embodiment of the present disclosure, as illustrated in FIG. 6, the system can further include a depth-of-focus correcting device 616 coupled respectively to the location detecting device 614 and the master control device 615.

The master control device 615 is further configured to control the display panel 611 to display at least two depth-of-focus test images before the three-dimension touch and interaction mode is enabled.

The location detecting device 614 is configured to determine the relative location relationship between the touch position of the operator and the display panel 611 according to the transmitting time of the ultrasonic signals transmitted by the at least two ultrasonic transmitters 612 and the receiving time of the ultrasonic signals received by the at least two ultrasonic sensors 613, where the ultrasonic signals received by the ultrasonic sensors 613 are the ultrasonic signals reflected at the touch position of the operator.

The depth-of-focus correcting device 616 is configured to correct errors between depths of focus perceived by the operator and preset depths of focus of the depth-of-focus test images according to the depth-of-focus test images and the relative location relationship between the touch position of the operator and the display panel 611.

Optionally in the system above for touch and interaction in a three-dimension display according to the embodiment of the present disclosure, the system includes four ultrasonic sensors 613.

The master control device 615 is configured to control the at least two ultrasonic transmitter 612 to transmit first ultrasonic signals scanning touch and interaction areas corresponding to areas where the ultrasonic sensors 613 are located; and to control the ultrasonic transmitters 612 to transmit second ultrasonic signals towards azimuths, of the touch position of the operator relative to the ultrasonic sensors 613, determined by the location detecting device 614, according to the azimuths.

The location detecting device 614 is configured to determine the azimuths of the touch position of the operator relative to the ultrasonic sensors 613 according to the differences between receiving time when the first ultrasonic signals reflected at the touch position of the operator are received by the respective ultrasonic sensors 613; to determine absolute distances between the touch position of the operator and the respective ultrasonic sensors 613 according to the differences between receiving time when the second ultrasonic signals reflected at the touch position of the operator are received by the respective ultrasonic sensors 613 and transmitting time when the second ultrasonic signals are transmitted by the respective ultrasonic transmitters 612; and to determine the relative location relationship between the touch position of the operator and the display panel 611 according to the average of the absolute distances between the touch position of the operator and the respective ultrasonic sensors 613.

Optionally in the system above for touch and interaction in a three-dimension display according to the embodiment of the present disclosure, the master control device 615 is configured to control phases of first ultrasonic signals transmitted by two sets of ultrasonic transmitters 612 located respectively on two sides of the display panel 611, where directions with the largest transmit energy produced as a result of wave interference between two first ultrasonic signals transmitted by each set of ultrasonic transmitters 612 are scan directions, and to control the scan directions of the two sets of ultrasonic transmitters 612 to rotate in opposite directions to scan the touch and interaction areas corresponding to the areas where the ultrasonic sensors 613 are located, where the scanning areas of the two sets of ultrasonic transmitters 612 do not overlap with each other.

Optionally in the system above for touch and interaction in a three-dimension display according to the embodiment of the present disclosure, the ultrasonic transmitters 612 are loudspeakers.

Those skilled in the art can clearly appreciate from the foregoing description of the embodiments that the embodiments of the present disclosure can be implemented in hardware or in software plus a necessary general hardware platform. Based upon such understanding, the technical solutions according to the embodiments of the present disclosure can be embodied in the form of a software product, which can be stored in a nonvolatile storage medium (e.g., a CD-ROM, a U-disk, a mobile hard disk, etc.), and which includes several instructions to cause a computer device (e.g., a personal computer, a server, a network device, etc.) to perform the method according to the respective embodiments of the present disclosure.

Those skilled in the art can appreciate that the drawings are merely a schematic diagram of preferred embodiments, and the module(s) or the flow(s) may not necessarily be required to implement the embodiments of the present disclosure.

Those skilled in the art can appreciate that the respective modules in the device according to the embodiments of the present disclosure can be distributed in the device according to the embodiments of the present disclosure as described in the embodiments of the disclosure, or can be modified accordingly to be located in one or more different devices from the device according to the embodiments of the present disclosure. The modules in the embodiments of the present disclosure can be combined into a module, or can be subdivided into a plurality of sub-modules.

The embodiments above of the present disclosure have been numbered only for the sake of a convenient description, but will not suggest any superiority of one embodiment to another.

In the system and method above for touch and interaction in a three-dimension display according to the embodiments of the present disclosure, after a three-dimension touch and interaction mode is enabled, firstly a relative location relationship between a touch position of an operator and a display panel is determined according to transmitting time of ultrasonic signals transmitted by at least two ultrasonic transmitters and receiving time when ultrasonic signals reflected at the touch position of the operator are received by at least two ultrasonic sensors; and then the ultrasonic transmitters are controlled to transmit ultrasonic signals at preset power to the touch position of the operator according to a three-dimension object currently displayed on the display panel and the relative location relationship between the touch position of the operator and the display panel to make feedback for a touch operation at the touch position of the operator, where the preset power matches a material of the three-dimension object and a touch relationship between the three-dimension object and the touch position of the operator. Feedback is made for the touch operation through controlling the ultrasonic signals, so that tactile perception can be obtained at the touch position of the operator; and the material of the currently displayed three-dimension object can be simulated through controlling the transmit power of the ultrasonic signals, so that a resisting force matching the material of the currently displayed three-dimension object can be perceived at the touch position of the operator through controlling the transmit power of the ultrasonic signals to simulate the material, to thereby achieve satisfactory touch and interaction and tactile perception, so as to improve a user experience of the operator.

The present disclosure has been described in a flow chart and/or a block diagram of the method, the device (system) and the computer program product according to the embodiments of the present disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perfoi in the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the present disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the present disclosure.

Evidently those skilled in the art can make various modifications and variations to the present disclosure without departing from the spirit and scope of the present disclosure. Thus the present disclosure is also intended to encompass these modifications and variations thereto so long as the modifications and variations come into the scope of the claims appended to the present disclosure and their equivalents.

The invention claimed is:

1. A system for touch and interaction in a three-dimension display, comprising: a display panel, at least two ultrasonic transmitters and at least two ultrasonic sensors arranged on sides of the display panel, a location detecting device, and a master control device, wherein:
the location detecting device is coupled respectively to the ultrasonic transmitters and the ultrasonic sensors, and is configured to determine a relative location relationship between a touch position of an operator and the display panel, according to transmitting time of ultrasonic signals transmitted by the at least two ultrasonic transmitters and receiving time of ultrasonic signals received by the at least two ultrasonic sensors; and
the master control device is coupled respectively to the display panel, the ultrasonic transmitters and the location detecting device, and is configured to control the ultrasonic transmitters to transmit ultrasonic signals at preset power to the touch position of the operator according to a three-dimension object currently displayed on the display panel and the relative location relationship between the touch position of the operator and the display panel to make feedback for a touch operation at the touch position of the operator, wherein the preset power matches a material of the three-dimension object and a touch relationship between the three-dimension object and the touch position of the operator;
wherein the system further comprises a depth-of-focus correcting device coupled respectively to the location detecting device and the master control device, wherein:
the master control device is further configured to control the display panel to display at least two depth-of-focus test images before the three-dimension touch and interaction mode is enabled; and
the depth-of-focus correcting device is configured to correct errors between depths of focus perceived by the operator and preset depths of focus of the depth-of-focus test images according to the depth-of-focus test images and the relative location relationship between the touch position of the operator and the display panel.

2. The system for touch and interaction according to claim 1, wherein the system comprises four ultrasonic sensors;
the master control device is configured to control the at least two ultrasonic transmitter to transmit first ultrasonic signals scanning touch and interaction areas corresponding to areas where the ultrasonic sensors are located; and to control the ultrasonic transmitters to transmit second ultrasonic signals towards azimuths, of the touch position of the operator relative to the ultrasonic sensors, determined by the location detecting device, according to the azimuths; and
the location detecting device is configured to determine the azimuths of the touch position of the operator relative to the ultrasonic sensors according to the differences between receiving time when the first ultrasonic signals reflected at the touch position of the operator are received by the respective ultrasonic sensors; to determine absolute distances between the touch position of the operator and the respective ultrasonic sensors according to the differences between receiving time when the second ultrasonic signals reflected at the touch position of the operator are received by the respective ultrasonic sensors and transmitting time when the second ultrasonic signals are transmitted by the respective ultrasonic transmitters; and to determine the relative location relationship between the touch position of the operator and the display panel according to the average of the absolute distances between the touch position of the operator and the respective ultrasonic sensors.

3. The system for touch and interaction according to claim 2, wherein the master control device is configured to control phases of first ultrasonic signals transmitted by two sets of ultrasonic transmitters located respectively on two sides of the display panel, wherein directions with the largest transmit energy produced as a result of wave interference between two first ultrasonic signals transmitted by each set of ultrasonic transmitters are scan directions, and to control the scan directions of the two sets of ultrasonic transmitters to rotate in opposite directions to scan the touch and interaction areas corresponding to the areas where the ultrasonic sensors are located, wherein scanning areas of the two sets of ultrasonic transmitters do not overlap with each other.

4. The system for touch and interaction according to claim 1, wherein the ultrasonic transmitters are loudspeakers.

5. A method for touch and interaction in a three-dimension display, comprising:
determining a relative location relationship between a touch position of an operator and a display panel, according to transmitting time of ultrasonic signals transmitted by at least two ultrasonic transmitters and receiving time of ultrasonic signals received by at least two ultrasonic sensors; and controlling the ultrasonic transmitters to transmit ultrasonic signals at preset power to the touch position of the operator according to a three-dimension object currently displayed on the display panel and the relative location relationship between the touch position of the operator and the display panel to make feedback for a touch operation at the touch position of the operator, wherein the preset power matches a material of the three-dimension object and a touch relationship between the three-dimension object and the touch position of the operator;

wherein the method further comprises:

controlling the display panel to display at least two depth-of-focus test images; and correcting errors between depths of focus perceived by the operator and preset depths of focus of the depth-of-focus test images according to the depth-of-focus test images and the relative location relationship between the touch position of the operator and the display panel.

6. The method for touch and interaction according to claim 5, wherein determining the relative location relationship between the touch position of the operator and the display panel according to the transmitting time of the ultrasonic signals transmitted by the at least two ultrasonic transmitters and the receiving time of the ultrasonic signals received by the at least two ultrasonic sensors comprises:

there are four ultrasonic sensors;

controlling the at least two ultrasonic transmitter to transmit first ultrasonic signals scanning touch and interaction areas corresponding to areas where the ultrasonic sensors are located;

determining azimuths of the touch position of the operator relative to the ultrasonic sensors according to the differences between receiving time when the first ultrasonic signals reflected at the touch position of the operator are received by the respective ultrasonic sensors;

controlling the ultrasonic transmitters to transmit second ultrasonic signals towards the azimuths;

determining absolute distances between the touch position of the operator and the respective ultrasonic sensors according to the differences between receiving time when the second ultrasonic signals reflected at the touch position of the operator are received by the respective ultrasonic sensors and transmitting time when the second ultrasonic signals are transmitted by the respective ultrasonic transmitters; and determining the relative location relationship between the touch position of the operator and the display panel according to the average of the absolute distances between the touch position of the operator and the respective ultrasonic sensors.

7. The method for touch and interaction according to claim 6, wherein controlling the at least two ultrasonic transmitters to transmit the first ultrasonic signals scanning the touch and interaction areas corresponding to the areas where the ultrasonic sensors are located comprises:

controlling phases of first ultrasonic signals transmitted by two sets of ultrasonic transmitters located respectively on two sides of the display panel, wherein directions with the largest transmit energy produced as a result of wave interference between two first ultrasonic signals transmitted by each set of ultrasonic transmitters are scan directions, and controlling the scan directions of the two sets of ultrasonic transmitters to rotate in opposite directions to scan the touch and interaction areas corresponding to the areas where the ultrasonic sensors are located, wherein scanning areas of the two sets of ultrasonic transmitters do not overlap with each other.

* * * * *